US012619337B2

(12) United States Patent
Borrows et al.

(10) Patent No.: US 12,619,337 B2
(45) Date of Patent: May 5, 2026

(54) EVENT PLANNING SYSTEM

(71) Applicant: Cvent, Inc., Tysons Corner, VA (US)

(72) Inventors: Lindsey Borrows, Buffalo, NY (US);
Kelsey Davis, Long Beach, CA (US)

(73) Assignee: Cvent, Inc., Tysons Corner (VA)

( * ) Notice: Subject to any disclaimer, the term of this
patent is extended or adjusted under 35
U.S.C. 154(b) by 163 days.

(21) Appl. No.: 18/397,519

(22) Filed: Dec. 27, 2023

(65) Prior Publication Data

US 2025/0217747 A1    Jul. 3, 2025

(51) Int. Cl.
*G06F 3/048* (2013.01)
*G06F 3/0482* (2013.01)
(52) U.S. Cl.
CPC .................................. *G06F 3/0482* (2013.01)
(58) Field of Classification Search
CPC ..................................................... G06F 3/0482
See application file for complete search history.

(56) References Cited

U.S. PATENT DOCUMENTS

| | | | | |
|---|---|---|---|---|
| 11,922,350 | B1 * | 3/2024 | Greenberg ........... | G06Q 10/103 |
| 2009/0265246 | A1 * | 10/2009 | Nelson ............... | G06Q 30/0601 |
| | | | | 705/26.1 |
| 2010/0082374 | A1 * | 4/2010 | Charania ............ | G06Q 30/0601 |
| | | | | 705/26.1 |
| 2014/0288980 | A1 * | 9/2014 | Lee ........................ | G06Q 10/02 |
| | | | | 705/5 |
| 2015/0112738 | A1 * | 4/2015 | Marinaro ............... | G06Q 10/02 |
| | | | | 705/5 |
| 2015/0154514 | A1 * | 6/2015 | Hall ....................... | G06Q 10/06 |
| | | | | 705/5 |
| 2023/0136668 | A1 * | 5/2023 | Culver ................... | G06F 16/93 |
| | | | | 715/764 |
| 2025/0068636 | A1 * | 2/2025 | Nash ..................... | G06F 16/951 |
| 2025/0217747 | A1 * | 7/2025 | Borrows .......... | G06Q 10/06375 |

OTHER PUBLICATIONS

Knowland; "Knowland"; YouTube; uploaded Aug. 19, 2019; https://www.youtube.com/watch?v=0oVhV3TAgvk; 1 page.

* cited by examiner

*Primary Examiner* — David Phantana-angkool
(74) *Attorney, Agent, or Firm* — Jeffri A. Kaminski;
Venable LLP

(57) ABSTRACT

A system for event planning includes a processor and a non-transitory computer readable medium storing a set of instructions which when executed by the processor configure the processor to receive awarded RFP data from a plurality of venues, receive a comp set from a particular venue in the plurality of venues, the comp set comprising one or more venues in the plurality of venues, and display, to the particular venue, at least a portion of the awarded RFP data. The portion of the awarded RFP data is associated with venues that are in the plurality of venues and that also are in the comp set. The awarded RFP data comprises historical event data that is associated with a plurality of previously held events. The historical event data comprises dates the previously held events took place, venues where the previously held events were held, and names of the previously held events.

5 Claims, 10 Drawing Sheets

To FIG. 3B

510 Use awarded RFP data to train a model for event planning, resulting in a trained model 520 Using the trained model, generate predicted event data associated with a plurality of predicted events, 530 Display the predicted event data to a particular venue

BEGIN

END

500

EVENT PLANNING SYSTEM

BACKGROUND

1. Technical Field

Exemplary embodiments of the disclosure relate to data analytics for event planning, and more specifically, to data analytics for providing venues with competitive event information.

2. Discussion of Related Art

In the US, about a third of a hotel's revenue derives from meetings and events, also known as group business. Hotels gain group business revenue from sleeping rooms, meeting space, food & beverage, audiovisual and other sources. This being such a significant revenue generator, it is crucial for hoteliers to be able to target and win group business.

Hoteliers receive group business in the form of Requests For Proposal (RFPs), on which they send out proposals, and may subsequently be awarded ('win') the business. A hotelier typically receives a large volume of RFPs, Current systems lack the ability to associate relevant data sets with each other, identify trends and the like, and utilize that data in decision making. Thus it may be advantageous to use automated machine learning software to determine planner activity and RFP awards across competing venues, understand what business is being missing, and attempt to secure comparable business in the future. It is desirable for such a system to analyze and provide information to venues about where RFPs have been awarded.

SUMMARY

According to some embodiments, a method for event planning includes receiving awarded request for proposal (RFP) data from a group of venues, the awarded RFP data including historical event data that is associated with a group of previously held events, the historical event data including dates the previously held events took place, venues where the previously held events were held, and names of the previously held events. The method further includes receiving a comp set from a particular venue in the group of venues, the comp set including one or more venues in the group of venues, and displaying, to the particular venue, at least a portion of the awarded RFP data, the portion of the awarded RFP data being associated with venues that are in the group of venues and that also are in the comp set.

According to some embodiments, a system for event planning includes a processor and a non-transitory computer readable medium storing a set of instructions, which when executed by the processor, configure the processor to receive awarded request for proposal (RFP) data from a group of venues, the awarded RFP data including historical event data that is associated with a group of previously held events, the historical event data including dates the previously held events took place, venues where the previously held events were held, and names of the previously held events. The instructions, when executed, further configure the processor to receive a comp set from a particular venue in the group of venues, the comp set including one or more venues in the group of venues, and display, to the particular venue, at least a portion of the awarded RFP data, the portion of the awarded RFP data being associated with venues that are in the group of venues and that also are in the comp set.

According to some embodiments, a non-transitory computer-readable medium stores a set of instructions for event planning, which when executed by a computer, configure the computer to receive awarded request for proposal (RFP) data from a group of venues, the awarded RFP data including historical event data that is associated with a group of previously held events, the historical event data including dates the previously held events took place, venues where the previously held events were held, and names of the previously held events. The instructions, when executed, further configure the computer to receive a comp set from a particular venue in the group of venues, the comp set including one or more venues in the group of venues, and display, to the particular venue, at least a portion of the awarded RFP data, the portion of the awarded RFP data being associated with venues that are in the group of venues and that also are in the comp set.

According to some embodiments, a method of displaying event planning information on a user interface includes selecting, from awarded request for proposal (RFP) data from a group of venues, a portion of awarded RFP data associated with venues that are in the group of venues and that also are in a comp set for a particular venue, such that the comp set includes one or more venues in the group of venues. The method further includes displaying, on the user interface, the portion of awarded RFP data in a calendar grid of cells comprising multiple rows and columns, with each row of the calendar grid corresponding to a different venue in the comp list and each column of the calendar grid corresponding to a different day. The method further includes displaying, in each cell, information associated with any events occurring at a respective venue corresponding to a row of the cell and occurring on a respective date corresponding to a column of the cell.

According to some embodiments, a method of displaying event planning information on a user interface includes selecting, from awarded request for proposal (RFP) data from a group of venues, a portion of awarded RFP data associated with venues that are in the group of venues and that also are in a comp set for a particular venue, such that the comp set includes one or more venues in the group of venues. The method further includes displaying, on the user interface, the portion of awarded RFP data in a sortable list comprising multiple rows and columns, with each row of the sortable list corresponding to a different event in the portion of the awarded RFP data, and each column of the sortable list corresponding to a group of fields storing information associated with each event. The method further includes receiving a user input to request display of awarded RFP data sorted according to a particular field in the group of fields. The method further includes, in response to receiving the user input, displaying on the user interface in the sortable list of cells, rows of awarded RFP data sorted by the particular field, such that the information associated with each event includes an event cost, an event description, and an awarded venue location.

BRIEF DESCRIPTION OF THE DRAWINGS

Further objectives and advantages will become apparent from a consideration of the description, drawings, and examples.

DETAILED DESCRIPTION

Figure 1A:
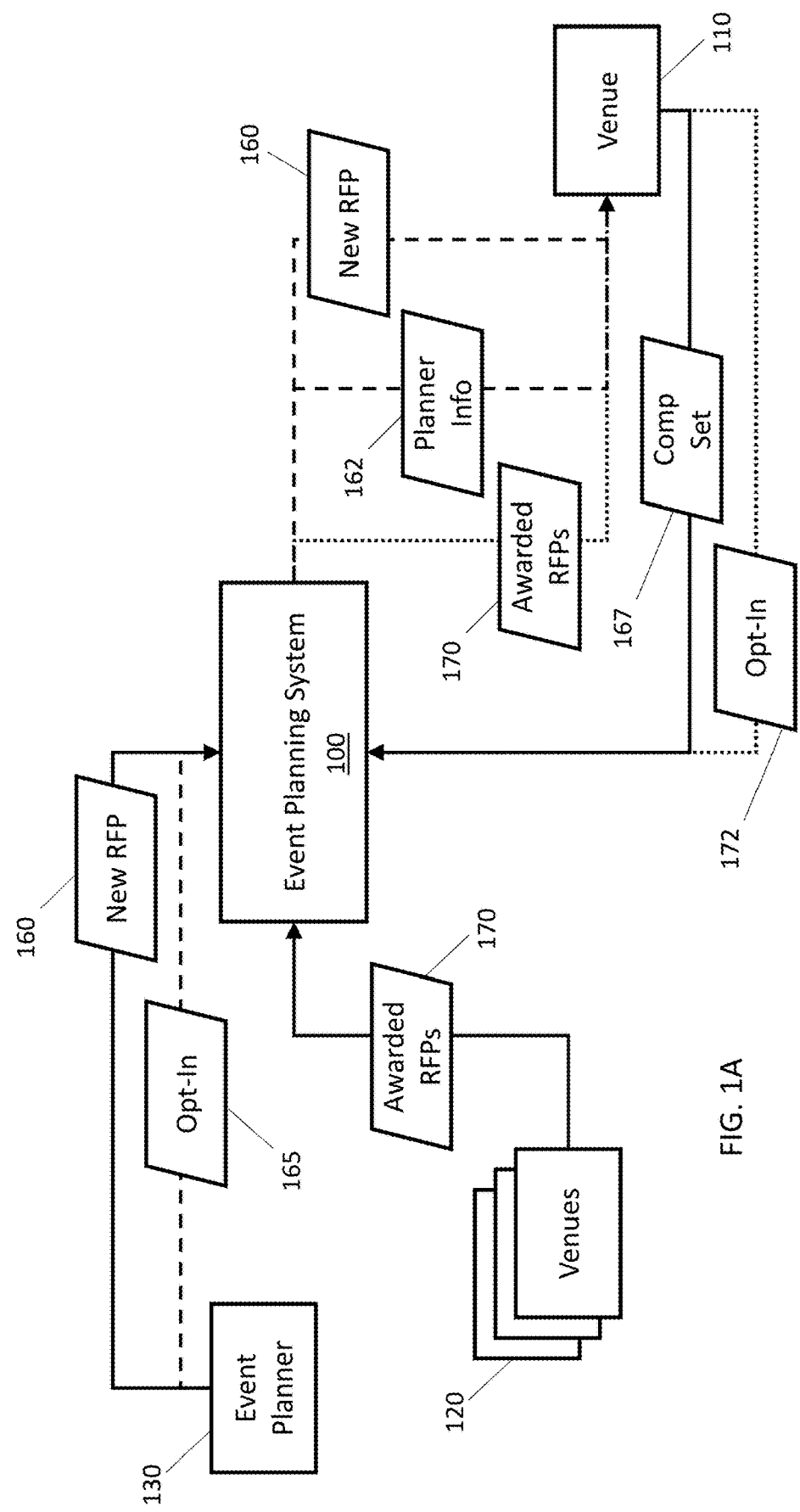
FIGS. 1A and 1B show a system for event planning of some embodiments.

Some embodiments of the current invention are discussed in detail below. In describing embodiments, specific terminology is employed for the sake of clarity. However, the current invention is not intended to be limited to the specific terminology so selected. A person skilled in the relevant art will recognize that other equivalent components can be employed, and other methods developed, without departing from the broad concepts of the current invention. All references cited anywhere in this specification, including the Background and Detailed Description sections, are incorporated by reference as if each had been individually incorporated.

In various embodiments, a request for proposal (RFP) may refer to a formal document or communication initiated by a party (e.g., an event planner) seeking to solicit proposals or bids from potential suppliers, manufacturers, or service providers to fulfill a specific need or requirement. The RFP may outline the technical details, specifications, and/or the legal and contractual terms for potential partners or collaborators, and serve as a structured method for identifying and engaging potential partners or business entities. RFP refers to this and similar types of communications, etc.

In various embodiments, an awarded RFP, may refer to an RFP that has been awarded by an event planner (or other party issuing the RFP) to a venue. The awarded RFP may include confidential information, including but not limited to financial data, that the event planner, the venue which was awarded the RFP, or both may not desire to share publicly. The awarded RFP may refer to an event that has already occurred (equivalently referred to as a past event or a historical event) or an event that has not yet occurred (equivalently referred to as a future event or a scheduled event).

In various embodiments, an event planner may refer to any entity that issues or awards an RFP for an event. The event planner may be the entity who is conducting the event, or may be contracted by that entity to find a suitable venue.

In various embodiments, a comp set, short for competitive set, as may refer to a group of rival or competing properties that are used for comparison and/or benchmarking purposes. These properties are typically selected based on their similarities to a specific hotel or establishment. The purpose of creating a comp set may be to analyze and evaluate the performance, pricing, and other key metrics of the subject property in comparison to its competitors. A comp set may include venues such as hotels, resorts, or convention centers, located in the same geographic area, having similar target markets, offering comparable services and amenities, and/or sharing other relevant characteristics. Hotel managers and stakeholders often study the performance of their property in relation to the comp set to make informed decisions about pricing, marketing strategies, and overall competitiveness within the market.

Some embodiments provide a system that selects and shows awarded RFP data to venues, for example, in some cases other venues that were also provided and/or responded to the RFP. For example, a particular venue may use awarded RFP data to understand what events are being awarded to other venues in their comp set, to understand what event business opportunities they may be missing out on, and inform the effort by the particular venue to be competitive in securing such events in the future.

In some embodiments, the system shows venues where a planner actually held a given event, rather than just to which venues the RFP for the event was sent. The awarded RFP data may be sourced by opt-in from venues themselves. The awarded RFP data may also be sourced in some embodiments from public sources, and/or the planners themselves.

Figure 1B:
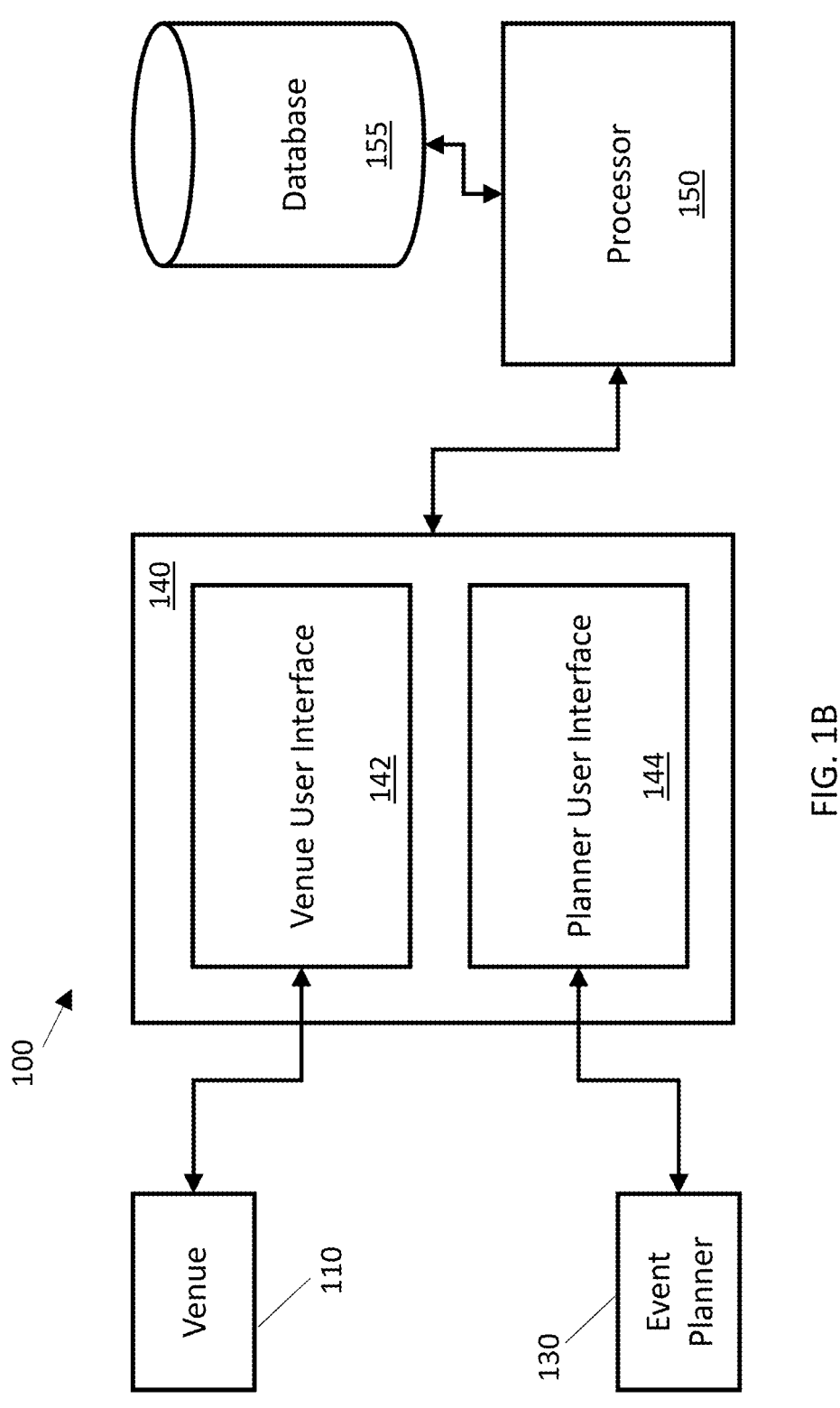

FIGS. 1A and 1B show a system 100 for event planning of some embodiments. In this example, the system 100 is here shown in communication with a venue 110, a group of venues 120, and an event planner 130. In this example, the venues 120 includes the venue 110.

In some embodiments, the system 100 includes a user interface 140 in communication with venues and event planners that use the system 100. In some embodiments, the system 100 communicates with the venue 110, venues 120, and/or planner 130 by transmission of the data as an electronic signal over a network. For example, the venue 110, venues 120, and planner 130 may access the system 100 through the user interface 140 provided by the system 100 over the network, and the system 100 receives and provides data to and from the venue 110, venues 120, and/or planner 130 through that user interface 140. This data includes, but is not limited to, RFP data, venue profile data, planner profile data, comp set data, and authorizations (e.g., opt-in, etc.).

In some embodiments, the user interface 140 includes, but is not limited to, a venue user interface 142 to communicate with the venue 110 (and the venues 120), and a planner user interface 144 to communicate with the event planner 130. The venue user interface 142 may be a separate from the planner user interface 144, or the interfaces may be different operating modes of the user interface 140.

In some embodiments, the planner user interface 144 may be used to receive data and/or information from an event planner (e.g., event planner 130), such as, but not limited to, settings and profile preferences, opt-in authorizations, RFPs, and RFP management instructions such as creating RFPs, awarding RFPs, designating target venues to receive an RFP, etc. The planner user interface 144 may also be used to provide information to the event planner, including but not limited to information on available venues (e.g., venue 110, venues 120, etc.).

In some embodiments, the venue user interface 142 may be used to receive data and/or information from a venue (e.g., venue 110, venues 120, etc.) such as, but not limited to, awarded RFPs, comp sets, and opt-in authorizations, as described in further detail below. The venue user interface 142 may also be used to provide data and/or information to a venue, such as, but not limited to, awarded RFP data, new RFP data, and planner contact information, as described in further detail below. In some embodiments, the venue user interface 142 is configured to display data and/or information to a venue in a list view or a calendar view.

In some embodiments, the system 100 may also include a processor 150 and a database 155. The database 155 may be used, for example, by the processor 150 to store (e.g., as database records) received data and/or information from venues (e.g., venue 110, venues 120, etc.) and event planners (e.g., event planner 130). Profile information regarding specific planners (including but not limited to contact information, financial/pricing information, etc.) and venues (including but not limited to event capacity information, financial/pricing information, contact information, etc.) may also be stored (e.g., as database records) in the database 155. The processor 150 may also perform a query to select and retrieve data and/or information from the database 155 to provide to or display to event planners and venues through the user interface 140.

Generally, any database record may be linked to another database record by creating a new association in the database between those records. As an example, data that is stored in the database 155 may be associated with database records (e.g., profiles) of specific venues and/or planners. For example, data stored in the database 155 for a specific RFP may be associated in the database 155 to database records of the planner authoring the RFP and to database records of venues that the RFP was targeted to. As another example, an opt-in authorization stored in the database 155 may be associated with a database record of a planner or venue that provided the opt-in authorization. As yet another example, a comp set received from a specific venue may be stored in the database 155 as a record and associated with database records of the specific venue as well as database records of the venues in the comp set. Furthermore, when a venue requests (e.g., by making a database query) for RFP data pertaining to its comp set, that relevant RFP data may be identified and selected from the database 155 by using the associations between the venue and the venues in the venue's comp set.

The event planner 130 may provide, to the system 100 and the system 100 receive, a new RFP 160 for a future event. The new RFP 160 may also include a selection of target venues, from one or more of the venues 120, to receive the new RFP 160. The event planner may also provide, to the system 100 and the system 100 receive, an opt-in 165 to share the new RFP 160 and/or the event planner contact information 162, with some or all of the venues associated with the system 100. The new RFP 160 and/or the opt-in 165 may be stored, for example, as a database record in the database 155.

The new RFP 160 and the opt-in 165 may be associated with each other in the database in some embodiments. For example, the new RFP 160 and the opt-in 165 may be stored in the database 155 as separate records, and an association created between them. As an alternative example, the opt-in 165 may be stored in the database 155 as a flag within the database record of the new RFP 160.

The venue 110 may provide, to the system 100 and the system 100 receive, a comp set 167 that includes a list of other venues. In some embodiments, at least some of the list of venues in the comp set 167 are other venues in the group of venues 120. The comp set 167 may be stored, for example, as a database record in the database 155.

In some embodiments, the comp set 167 is provided to the system 100 by the venue 110. In some embodiments, at least a portion of the comp set 167 may include venues in the group of venues 120 that were identified and/or selected by the system 100 as candidates for the comp set 167, to be approved by the venue 110. For example, the system 100 may perform an analysis of database records of the database 155 pertaining to the venues 120 to identify matches between venues that suggest they should be in each other's comp sets. In some embodiments, the system 100 uses a machine learning and/or artificial intelligence technique to perform the analysis of database records.

The venues 120 (including venue 110) may provide, to the system 100 and the system 100 receive, awarded RFP data 170. In some embodiments, receiving awarded RFP data 170 from a venue (e.g., venue 110) in the group of venues 120 includes, for at least one of the venues in the group of venues 120, an explicit or an implicit authorization to share the awarded RFP data 170 with other venues in the group of venues 120. The awarded RFP data 170 may be stored, for example, as a database record in the database 155.

In this example, venue 110 in the group of venues 120 provides an opt-in 172 to share the awarded RFP data 170 only with other venues that also provide the same authorization. Such an opt-in 172 may be referred to as an "I'll show you mine if you show me yours" agreement. The opt-in 172 may be stored, for example, as a database record in the database 155.

The awarded RFP data 170 and the opt-in 172 may be associated with each other in the database in some embodiments. For example, the awarded RFP data 170 and the opt-in 172 may be stored in the database 155 as separate records, and an association created between them. As another example, the opt-in 172 may be stored in the database 155 as a flag within the database record of the awarded RFP data 170.

In some embodiments, the awarded RFP data 170 may include any data from the RFP, for example, room nights, meetings, attendee count, etc. It may also include historical event data that is associated with previously held events. For example, the historical event data may include one or more of the dates the previously held events took place, venues where the previously held events were held, and names of the previously held events.

In some embodiments, the awarded RFP data 170 includes future event data that is associated with events that are scheduled in the future. For example, the future event data may include one or more of the dates the future events are scheduled to take place, venues where the future events are scheduled to be held, and names of the future events.

In some embodiments, the awarded RFP data 170 includes, for at least one event, financial data associated with the event. The financial data may include, but is not limited to, the budget for the event, and the actual cost of the event at the venue to which the RFP was awarded.

The venue 110 receives (e.g., through the venue user interface 142) from the system 100, awarded RFP data 170 from the other venues 120 only if it has also provided the opt-in 172 to share its own awarded RFP data. The conditional provision from the venue 110 to the system 100, and the associated receipt by the venue 110 from the system 100, are indicated in FIG. 1A by dotted lines. The venue 110 receives (e.g., through the venue user interface 142) from the system 100, the event planner contact information 162 only if the event planner 130 has provided the opt-in 165 to share that information. The conditional provision from the event planner 130 to the system 100, and the associated receipt by the venue 110 from the system 100, are indicated in FIG. 1A by dashed lines.

The venue 110 also receives (e.g., through the venue user interface 142) from the system 100, the new RFP 160 from the event planner 130, if the event planner 130 has selected the venue 110 as a target venue, or if the event planner has included an authorization with the new RFP 160 to share it with venues 120 (here inclusive of venue 110). In some embodiments, such an authorization by the event planner 130 is a blanket authorization for all new RFPs. Alternatively, the authorization may be provided on a per-RFP basis. The authorization for sharing the new RFP 160 may be included in the opt-in 165 for sharing the event planner 130 contact info, or may be a separate authorization. The conditional receipt of the new RFP 160 by the venue 110 from the system 100 is also indicated in FIG. 1A by a dashed line.

Figure 2:
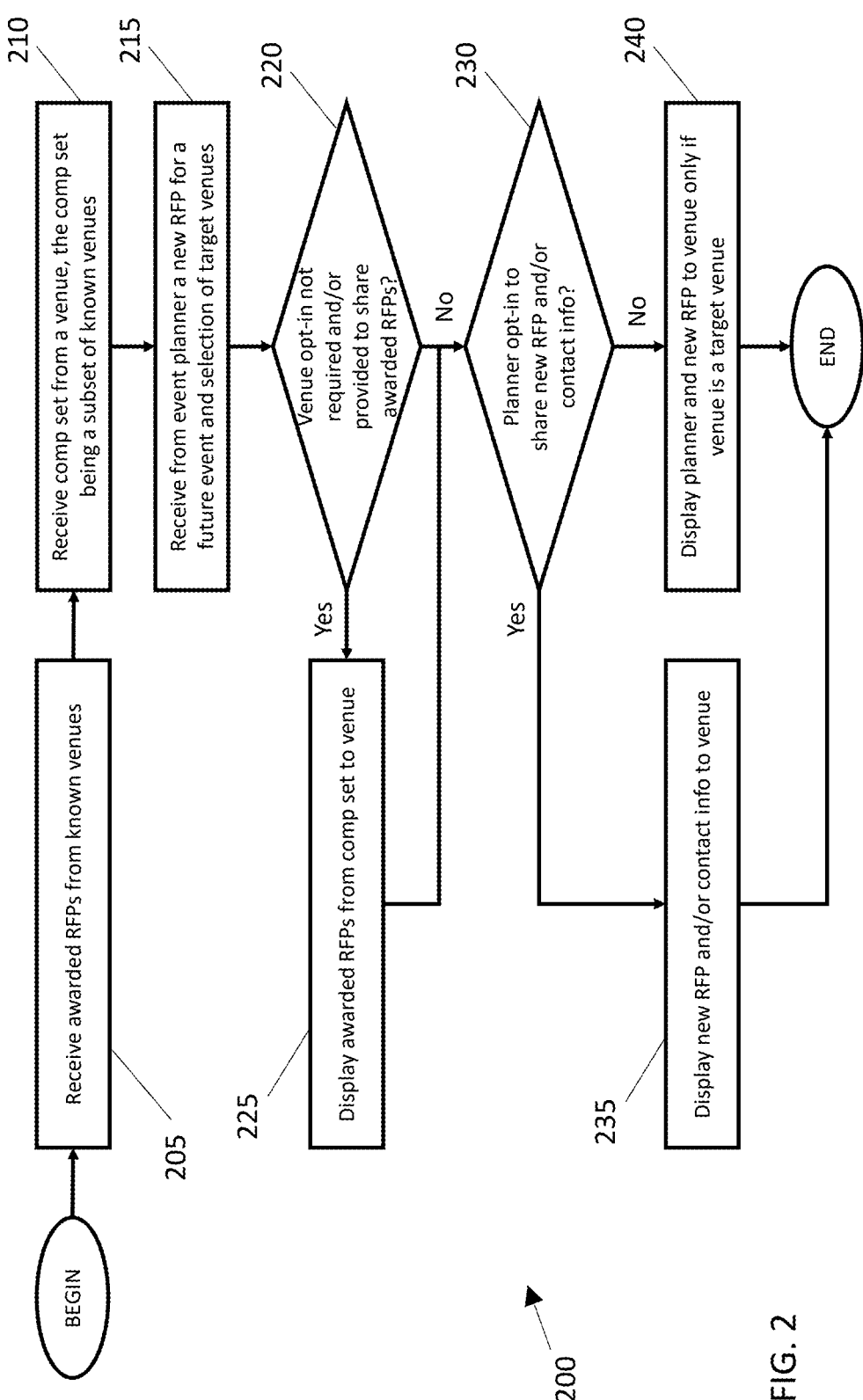
FIG. 2 shows a process that is performed in some embodiments by an event planning system.

FIG. 2 shows a process 200 that is performed in some embodiments by the system 100. At 205, the process 200 receives data regarding awarded RFPs (e.g., awarded RFP data 170) from a group of venues (e.g., venues 120). These venues (or representatives thereof) may be users of the system to receive and bid on RFPs from event planners (e.g., event planner 130). In some embodiments, the process 200 may receive the awarded RFP data from the venues through a general user interface (e.g., user interface 140) or a venue-specific user interface (e.g., venue user interface 142). In some embodiments, the user interface is provided to the venues over a network.

The process 200, at 210, receives from a particular venue (e.g., venue 110), a comp set (e.g., comp set 167), the comp set including (but not limited to) a list of other venues in the group of venues from which awarded RFPs were received. In some embodiments, the process 200 may receive the comp set from the particular venue through the general user interface or the venue-specific user interface. In some embodiments, the user interface is provided to the particular venue over a network.

In some embodiments, the process 200, at 215, receives from an event planner (e.g., event planner 130) a new RFP (e.g., new RFP 160) for a future event, and selection of target venues (e.g., venue 110 and/or venues 120) to receive the new RFP. The target venues include, for example, at least one venue that is in the comp set. In some embodiments, the process 200 may receive the new RFP and/or selection of target venues from the planner through a general user interface (e.g., user interface 140) or a planner-specific user interface (e.g., planner user interface 144). In some embodiments, the user interface is provided to the planner over a network.

The process 200, at 220, determines whether the particular venue has provided an authorization (e.g., opt-in 172) to share its awarded RFP data with other venues (e.g., venues 120). If the event is posted publicly, then opt-in is not required and the information may be shared. In some embodiments, the particular venue may provide the authorization through the general user interface or the venue-specific user interface. If the particular venue has provided such authorization, the process 200 continues to 225, which is described below. If the particular venue has not provided such authorization, the process 200 continues to 230, which is described below.

The process 200, at 225, displays to the particular venue, at least a portion of the awarded RFP data from those venues that are in the group of venues that provided awarded RFP data, and that also are in the comp set of the particular venue. In some embodiments, the process 200 may display at least the portion of the awarded RFP data through the general user interface or the venue-specific user interface. The awarded RFP data may include historical event data, future event data, or both. In some embodiments, the portion of awarded RFP data displayed to the particular venue also includes awarded RFP data from venues that are not in the comp set. In some embodiments, the portion of the awarded RFP data is displayed to the particular venue in a list view or a calendar view.

The process 200, at 230, determines whether the event planner has provided an authorization (e.g., opt-in 165) to share the new RFP and/or its contact information (e.g., event planner contact information 162) with other venues (e.g., venue 110, and/or venues 120). In some embodiments, the event planner may provide the authorization through the general user interface or the planner-specific user interface. If the event planner has provided such authorization, the process 200 continues to 235. The process 200, at 235, displays to the particular venue, the new RFP and/or contact information of the event planner. In some embodiments, the process 200 may display the new RFP and/or contact information through the general user interface or the venue-specific user interface.

If the event planner has not provided such authorization, the process 200 continues to 240. The process 200, at 240, only displays the new RFP and/or contact information of the event planner with the particular venue if the particular venue is selected by the event planner as a target venue for receiving the RFP. In some embodiments, the process 200 may display the new RFP and/or the contact information through the general user interface or the venue-specific user interface.

The process 200 then ends.

Figure 3A:
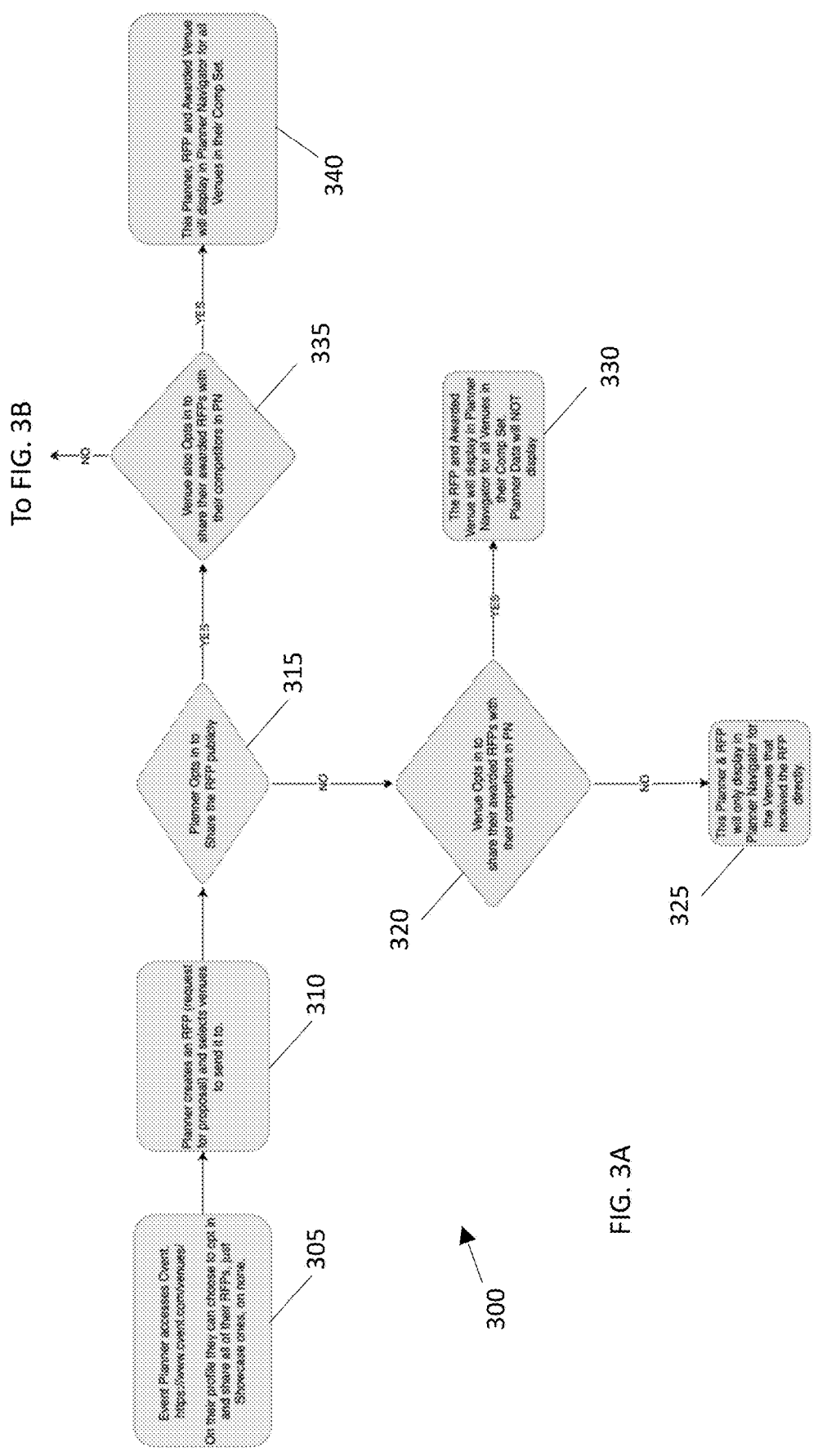
FIGS. 3A and 3B show a workflow diagram for use of an event planning system by an event planner and a venue in some embodiments.
Figures 3B, 4:
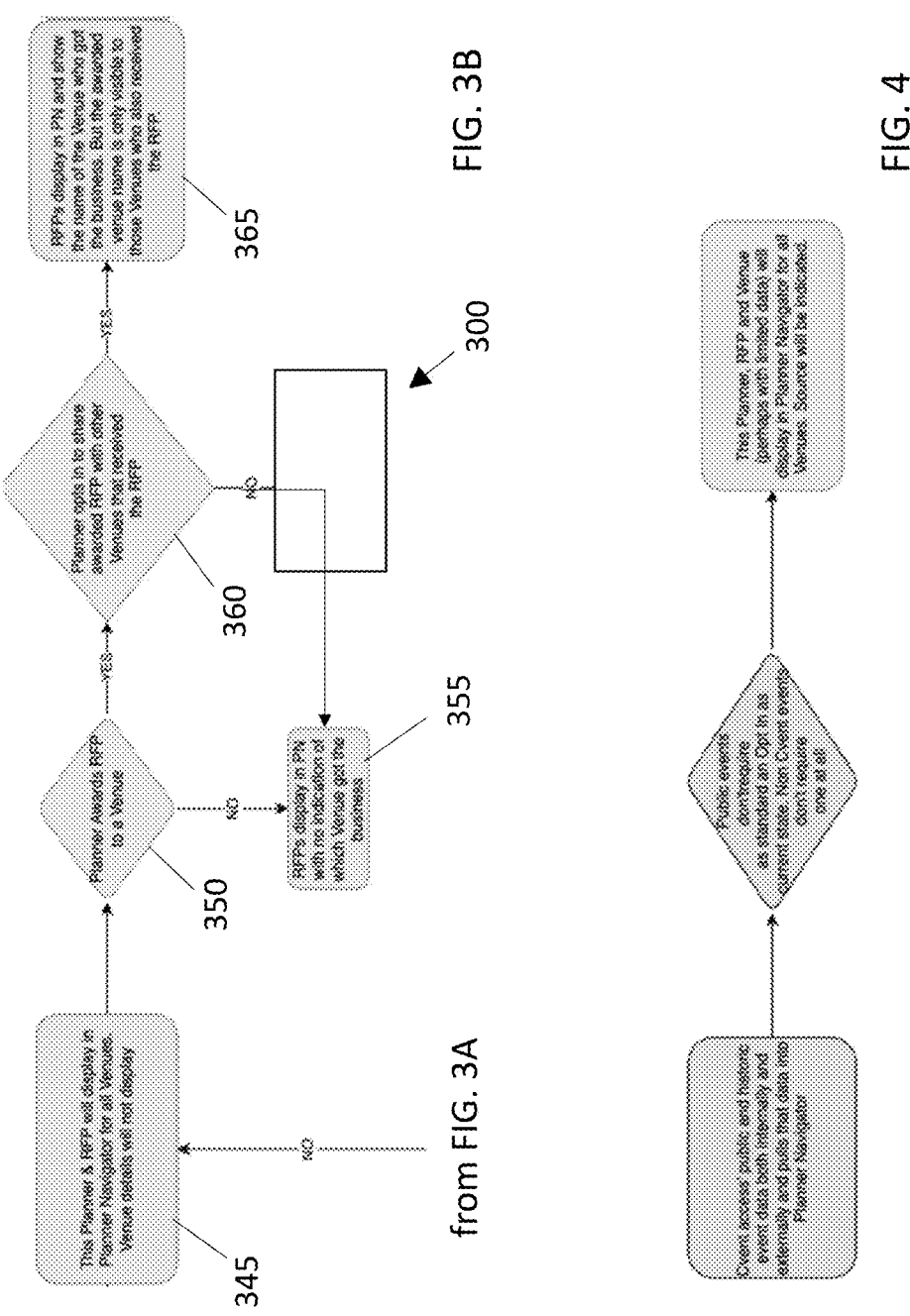
FIG. 4 shows a workflow diagram for displaying public data.

FIGS. 3A and 3B show a workflow diagram 300 for use of the system 100 in some embodiments by an event planner and a venue. At 305, an event planner (e.g., event planner 130) accesses the event planning system (e.g., system 100) and creates a profile. The profile allows the event planner to choose to opt-in and share all of their RFPs, opt-in to showcase or highlight specific RFPs, or none. The event planner may also choose, as part of the opt-in or as a separate opt-in, whether their contact information is shared with some or all venues on an individual basis or publicly.

At 310, the event planner creates a new RFP and selects venues to send it to.

At 315, the system determines whether the event planner has opted in to share the new RFP (and, optionally, their contact information) publicly. If the event planner has not opted in, then at 320, the system determines whether a particular venue has opted in to share their awarded RFPs with their competitors in the system.

If the particular venue has also not opted in, then (at 325) the new RFP (and, optionally, the event planner contact information) will only be shown to venues that were selected by the event planner to receive the RFP directly, via the event planning system. If the particular venue is not one of the selected venues, then it will not be shown the new RFP and will not be shown awarded RFPs from competitors.

If the particular venue has opted in, then (at 330) the new RFP and the awarded venue for that RFP will be shown to the particular venue for all venues in their comp set. The event planner contact information will not be shown to the particular venue if this was also specified by the event planner when the event planner chose not to opt-in as determined at 315 above.

In some embodiments, however, if the new RFP has not been awarded, then the new RFP will not be shown to the particular venue, since the event planner has opted out. Only awarded RFPs may be shown to the particular venue since those would (in this case) be governed by the venues' opt-in and not the event planner's opt-in.

Returning to 315, if the event planner has opted in to share the new RFP (and, optionally, their contact information) publicly, at 335, the system determines whether a particular venue has opted in to share their awarded RFPs with their competitors in the system.

If the particular venue has opted in, then (at 340) the new RFP and the awarded venue for that RFP will be shown to the particular venue for all venues in their comp set (since the particular venue opted in). The event planner contact information will be shown to the particular venue if the event planner opted in. Even if the new RFP has not been awarded, the new RFP will still be shown to the particular venue, since the event planner opted in as determined at 315 above.

Returning to 335, if the particular venue has not opted in, then (at 345) the new RFP (and, optionally, the event planner contact information) will be shown to all venues. However, venue details will not be shown. Continuing to 350, the system determines if the event planner has awarded the RFP to a venue. If not, then at 355, the system displays RFPs with no indication of which venue was awarded. If the RFP has been awarded, then at 360, the system determines whether the planner has opted in to share the awarded RFP with other venues that received the RFP. If not, then the system returns to 355, which was described above. If the planner has opted in to share the awarded RFP, then at 365, the RFPs are shown with the name of the venues to which they were awarded. However, the awarded venue name is only visible to those venues who also received the RFP.

In some embodiments, data from outside the system may also be shown to the venue. As an example, FIG. 4 shows a workflow diagram 400 for displaying public data. At 410, the system retrieves internally saved event data (e.g., historical events and future events) and also retrieves external public data (e.g., from venue websites, public calendars, etc.). As noted in 415, internal events marked public within the system (by the event planner or the venue) do not require as strict an opt in to display event data. Public events retrieved from external to the system do not require any opt-in at all. Accordingly, at 420, the planner contact info, the new RFP, and the awarded venue information for public events (internal and external) will be shown to all venues. In some embodiments the source of the data will also be indicated.

In some embodiments, an automated and/or scripted technique may be used to obtain external public data regarding public events. Such events may be labeled as "Public" when displayed. The "Public" label may also be used to label internal public event data that was marked as public by the event planner and/or the venue. Opt-in may not be required to view the public data.

In some embodiments, a machine learning and/or artificial intelligence technique may be used to obtain external public data regarding public events. Such events may be labeled as "AI discovered" when displayed.

Figure 5:
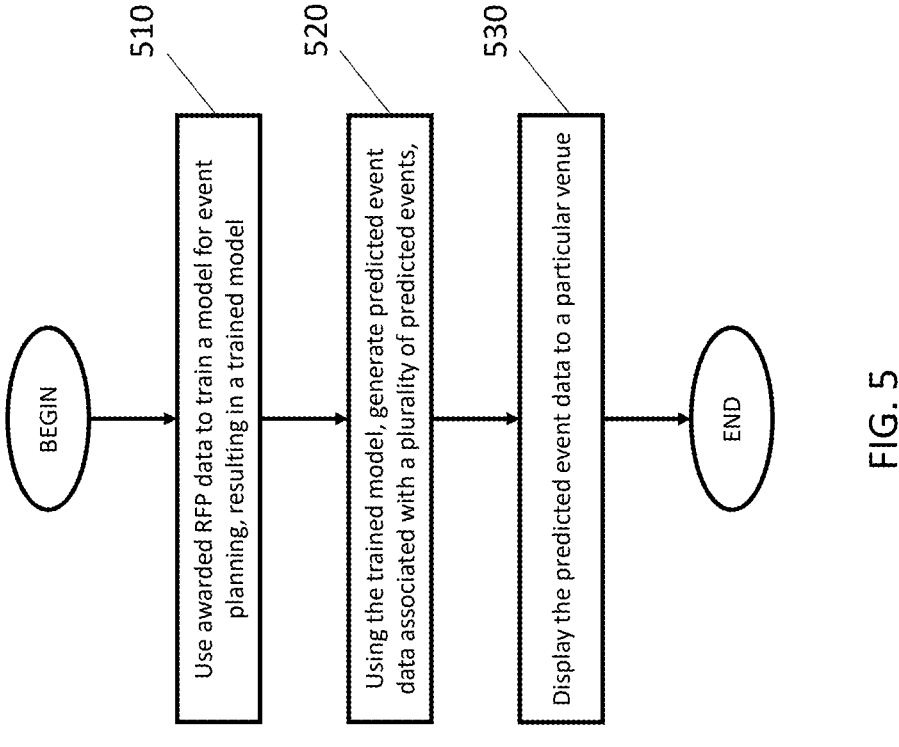
FIG. 5 shows a process of some embodiments for training a model for event planning.

In some embodiments, data from previous awarded RFPs may be used to generate predicted events. FIG. 5 shows a process 500 of some embodiments for training a model for event planning. The process 500 may be performed by the system 100 in some embodiments. For example, the process 500 may be performed by the processor 150 in some such embodiments.

At 510, the process 500 uses awarded RFP data (e.g., awarded RFP data 170) received from venues (e.g., venues 110 and/or 120), to train a model for event planning, resulting in a trained model. The model may be trained using statistical techniques, machine learning techniques, and/or artificial intelligence techniques. For example, in some embodiments, the model may be trained using a convolutional neural network or other type of neural network.

At 520, the process 500 uses the trained model to generate predicted event data corresponding to one or more predicted events. In some embodiments, the predicted event data includes one or more of dates the predicted events are predicted to take place, venues where the predicted events are predicted to be held, names of the predicted events, and financial data for at least one predicted event in the plurality of predicted events.

At 530, the process 500 displays the predicted event data to a particular venue. In some embodiments, the predicted event data is displayed to the particular venue in a list view or a calendar view. In some embodiments, predicted events may be labeled as "Predicted" when displayed.

The process 500 then ends.

Figure 6:
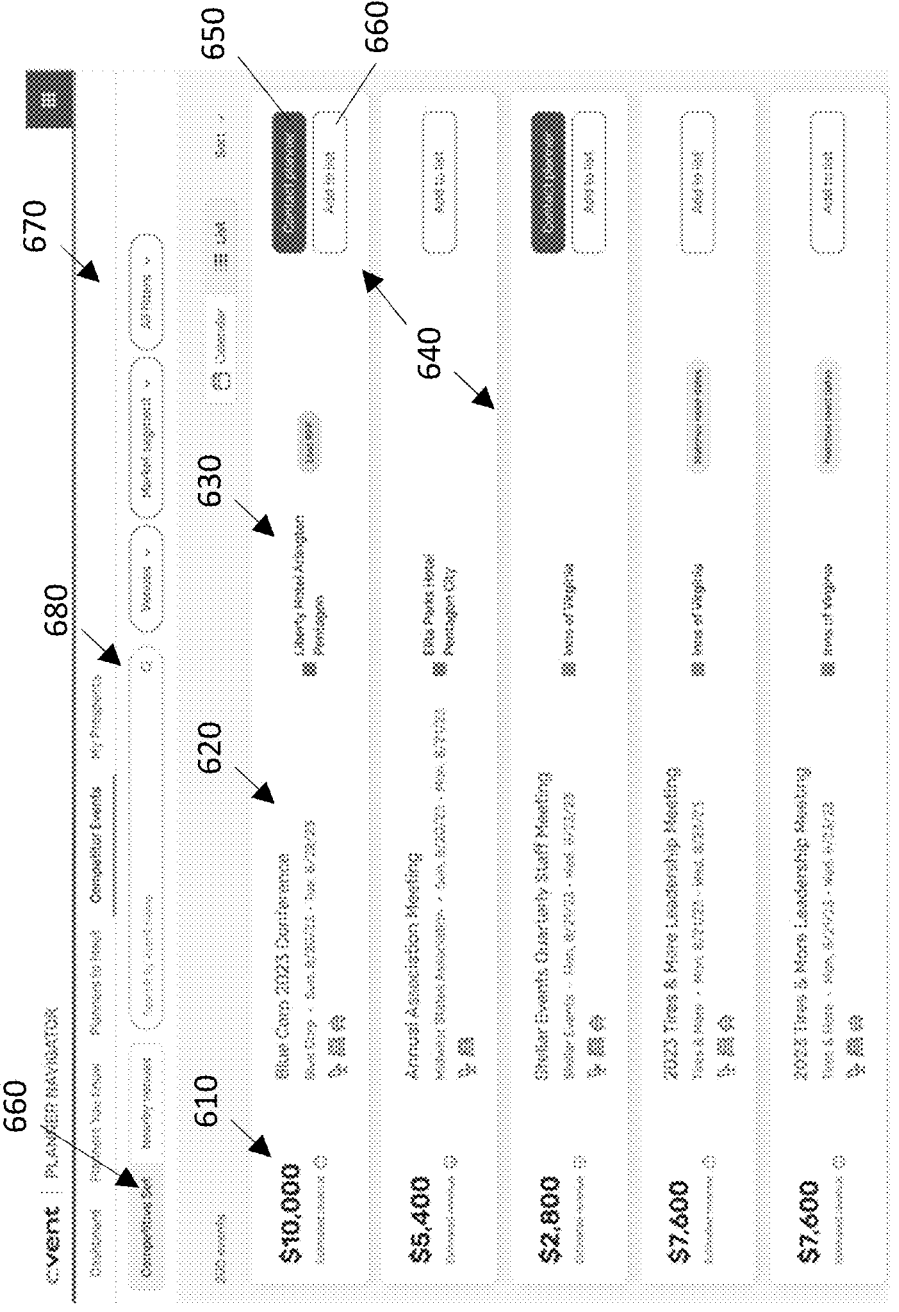
FIG. 6 shows a list view for displaying RFP data to venues, according to some embodiments.

FIG. 6 shows a list view 600 for displaying RFP data to venues, according to some embodiments. The list view 600 is similar in some respects to the embodiments of the calendar view 700 discussed herein with respect to FIG. 7, and the different sources view 800 discussed herein with respect to FIG. 8, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

In some embodiments, the list view 600 may be presented to the venue 110 as part of process 200, at operation 225, operation 235, and/or operation 240. The list view 600 may be presented to a venue via the user interface 140, and more specifically may be presented via the venue user interface 142.

The list view 600 presents RFP data (new, awarded, predicted, or any combination thereof) in rows, with each row corresponding to a separate RFP. The list view 600 presents data associated with each RFP into multiple sortable columns, including but not limited to a column 610 for financial information (e.g., event cost, event budget, etc.), a column 620 for event description information (e.g., event dates, event name, event owner, etc.), and a column 630 for awarded venue information. Venue information, which includes venue name and address or location (e.g., street address, city and state only, etc.), may be only for venues in the comp list or for all venues in the system. Additional columns 640 provide additional data as available, and user interface controls to perform actions, such as a "contact planner" button 650 to contact the event planner (if the venue is authorized to do so) and a "add to list" button 660 to add the RFP to a saved list for follow up.

An advantage of list view is that a user (i.e., a venue) may sort and filter awarded RFP data by financial information, event information, awarded venue information, and/or additional data. This enables the venue to set specific criteria to find awarded RFP data that meets specific business needs. Another advantage is that filtered events may be visible on one screen, as compared to a calendar in which the dates are changed or scrolling required to find the filtered events. The view may be toggled between comp set only venues or all venues, using a user interface control 660. One or more filters 670 are also provided to filter the RFPs being displayed in the list view 600, and a search bar 680 is also provided to search for RFPs.

Figure 7:
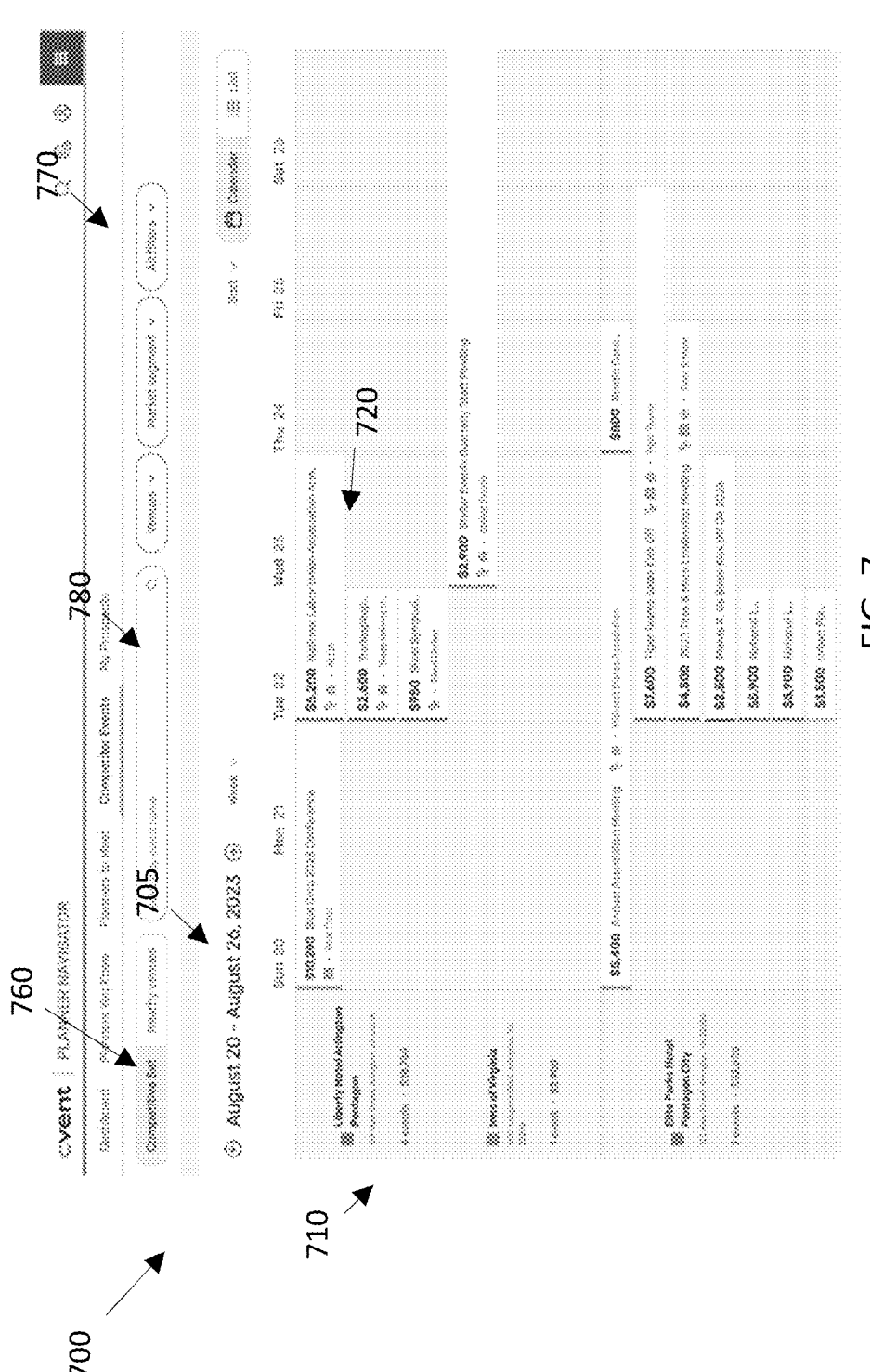
FIG. 7 shows a calendar view for displaying RFP data to venues, according to some embodiments.

FIG. 7 shows a calendar view 700 for displaying RFP data to venues, according to some embodiments. The calendar view 700 is similar in some respects to the embodiments of the list view 600 discussed herein with respect to FIG. 6, and the different sources view 800 discussed herein with respect to FIG. 8, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

In some embodiments, the calendar view 700 may be presented to the venue 110 as part of process 200, at operation 225, operation 235, and/or operation 240. The calendar view 700 may be presented to a venue via the user interface 140, and more specifically may be presented via the venue user interface 142.

The calendar view 700 presents RFP data (new, awarded, predicted, or any combination thereof) in a grid, with each row corresponding to a separate venue (e.g., the venues in the comp list) and each column corresponding to a separate day. The first column 710 shows the venue information, including the venue name and address, and may also show the summary of the events that are visible in the grid. The range of dates may be selected using a user interface control 705, and may be for any period for which data is available, including past, present, and future. The visible dates may also be browsed by scrolling the view to the left and right, and the visible venues may be browsed by scrolling the view up and down.

Each grid cell, such as grid cell 720, represents a time period, such as a month, week, single day, of events (as specified by the column) at a single venue (as specified by the row). For each event, at least the event name is shown, as well as additional event information, and financial information if available. If an event spans multiple days, then the entry for that event may span multiple grid cells. If there are no events scheduled for a given day at a given venue, then the grid cell is blank.

An advantage of calendar view is that a user (i.e., a venue) may view awarded RFP data by date. This enables the venue to identify what events may be occurring at competitor venues on dates where the venue has unused event capacity, and identify specific dates as being target dates for marketing in future years. Another advantage is this view may provide a holistic view of all events in a given week at other venues. Venues can compare this information to their own events for that same time period. The view may be toggled between comp set only venues or all venues, using a user interface control 760. One or more filters 770 are also provided to filter the RFPs being displayed in the calendar view 700, and a search bar 780 is also provided to search for RFPs.

Figure 8:
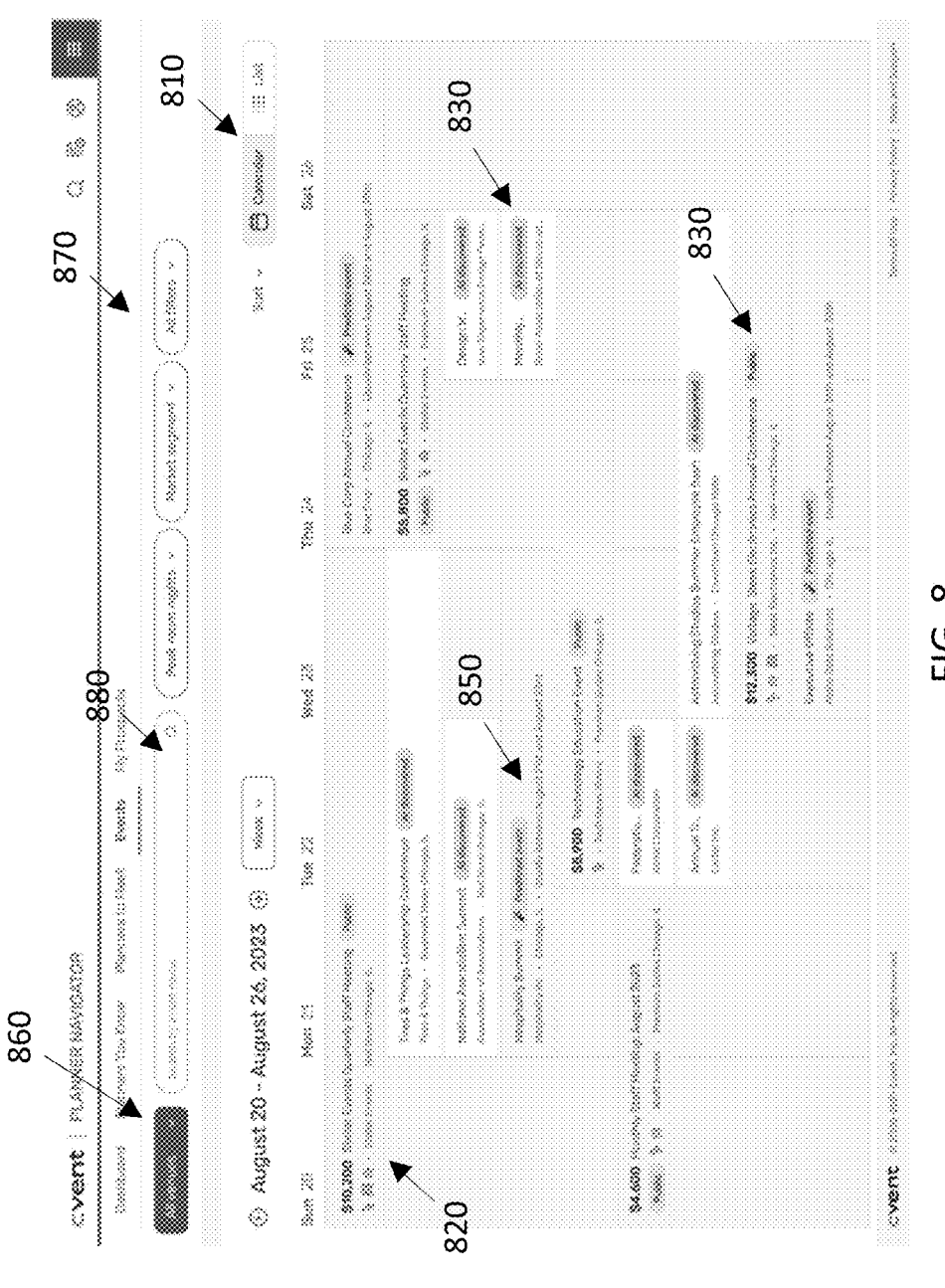
FIG. 8 shows a different sources view for displaying RFP data to venues, according to some embodiments.
Figure 9:
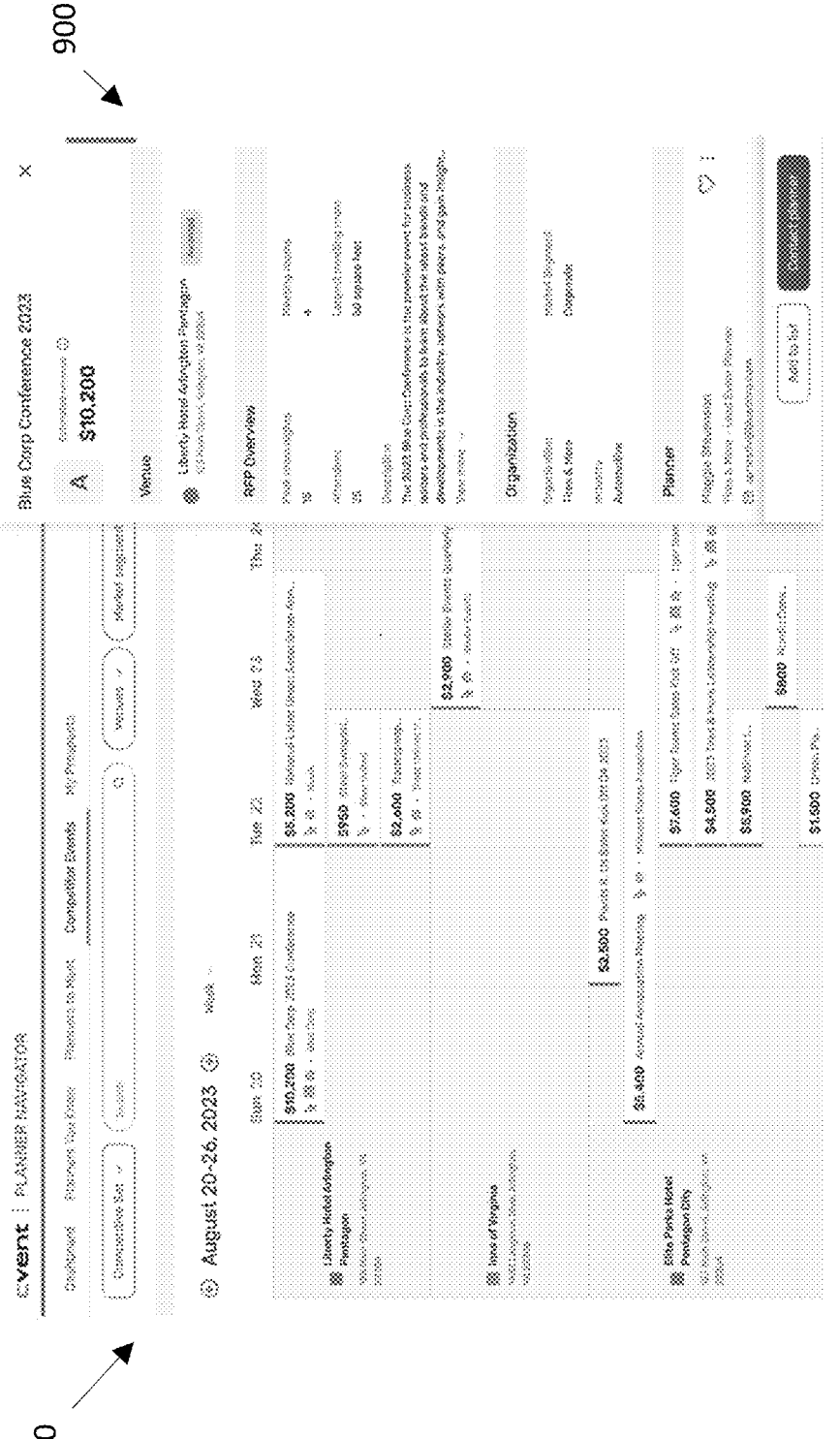
FIG. 9 shows a detailed view for displaying RFP data to venues, according to some embodiments.

FIG. 8 shows a different sources view 800 for displaying RFP data to venues, according to some embodiments. The different sources view 800 similar in some respects to the embodiments of the calendar view 700 discussed herein with respect to FIG. 7, and the list view 600 discussed herein with respect to FIG. 6, and like reference numerals have been used to refer to the same or similar components. A user may click on the event and the panel may open on the right with the full details, as shown in FIG. 9. A detailed description of these components will be omitted, and the following discussion focuses on the differences between these embodiments. Any of the various features discussed with any one of the embodiments discussed herein may also apply to and be used with any other embodiments.

In some embodiments, the different sources view 800 may be presented to the venue 110 as part of process 200, at operation 225, operation 235, and/or operation 240. The different sources view 800 may be presented to a venue via the user interface 140, and more specifically may be presented via the venue user interface 142. In this example, the different sources view 800 is substantially similar to the calendar view 700 described above with respect to FIG. 7, and adds additional event information from other sources than awarded RFP data from venues and new RFP data from event planners. In some embodiments, the different sources view may be substantially similar to the list view 600 described above with respect to FIG. 6. In some embodiments, the different sources view 800 may be toggled between the list view 600 and the calendar view 700, by using user interface control 810.

In some embodiments, the additional event information that is displayed in the different sources view 800 may include public event data, including but not limited to internally saved event data (e.g., historical events and future events) and external public data (e.g., from venue websites, public calendars, etc.). The public event data may, for example, be displayed in the different sources view 800 as described above with workflow diagram 400 with reference to FIG. 4.

In some embodiments, the additional event information that is displayed in the different sources view 800 may include predicted event data. The predicted event data may, for example, be generated and displayed using process 500 as described above with reference to FIG. 5.

In some embodiments, some or all of the events shown in the different sources view may be labeled to indicate what type of different source was used to characterize the event. For example, external public event data that was obtained using an automated and/or scripted technique (e.g., event 820), and/or internal public event data that was marked as public by the event planner and/or the venue (e.g., event 830), may be labeled as "Public" when displayed. As another example, external public data that was obtained using machine learning and/or artificial intelligence techniques (e.g., event 840), may be labeled as "AI discovered" when displayed. As yet another example, predicted events (e.g., event 850) may be labeled as "Predicted" when displayed. Other labels may also be used to characterize other types of events.

An advantage of different sources view is that a user (i.e., a venue) may identify what events may be occurring at competitor venues based on both awarded RFP data and public data, and forecast events for dates in the future, on dates where the venue has unused event capacity. The different sources view permits the venue to also distinguish and compare events that are scheduled using awarded RFP data, internal and external public events, and/or predicted events, and make business decisions accordingly. The view may be toggled between comp set only venues or all venues, using a user interface control 860. One or more filters 870 are also provided to filter the RFPs being displayed in the different sources view 800, and a search bar 880 is also provided to search for RFPs. The labels may also be used in some embodiments as direct filters so that clicking on a label restricts the view to showing only events sharing that label.

As described above, the system 100 may, in some embodiments, include a number of components, each of which may be implemented on a server or on an end-user device. In some cases, a subset of the components may execute on a user device (e.g., a mobile application on a cell phone, a webpage running within a web browser, a local application executing on a personal computer, etc.) and another subset of the components may execute on a server (a physical machine, virtual machine, or container, etc., which may be located at a datacenter, a cloud computing provider, a local area network, etc.).

The components of the system 100 may be implemented in some embodiments as software programs or modules. In other embodiments, some or all of the components may be implemented in hardware, including in one or more signal processing and/or application specific integrated circuits. While the components are shown as separate components, two or more components may be integrated into a single component. Also, while many of the components' functions are described as being performed by one component, the functions may be split among two or more separate components.

In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process.

As used in this specification, the terms "computer", "server", "processor", and "memory" all refer to electronic or other technological devices. These terms exclude people or groups of people. As used in this specification, the terms "computer readable medium," "computer readable media," and "machine readable medium," and so forth, are entirely restricted to tangible, physical objects that store information in a form that is readable by a computer. These terms exclude any wireless signals, wired download signals, and any other ephemeral signals.

The term "computer" is intended to have a broad meaning that may be used in computing devices such as, e.g., but not limited to, standalone or client or server devices. The computer may be, e.g., (but not limited to) a personal computer (PC) system running an operating system such as, e.g., (but not limited to) MICROSOFT® WINDOWS® available from MICROSOFT® Corporation of Redmond, Wash., U.S.A. or an Apple computer executing MAC® OS from Apple® of Cupertino, Calif., U.S.A. However, embodiments described herein are not limited to these platforms. Instead, embodiments may be implemented on any appropriate computer system running any appropriate operating system. For example, one illustrative embodiment may be implemented on a computer system operating as discussed herein. The computer system may include, e.g., but is not limited to, a main memory, random access memory (RAM), and a secondary memory, and so forth. Main memory, random access memory (RAM), and a secondary memory, and so forth, may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, and so forth.

The secondary memory may include, for example, (but not limited to) a hard disk drive and/or a removable storage drive, representing a floppy diskette drive, a magnetic tape drive, an optical disk drive, a read-only compact disk (CD-ROM), digital versatile discs (DVDs), flash memory (e.g., SD cards, mini-SD cards, micro-SD cards, and so forth), read-only and recordable Blu-Ray® discs, and so forth. The removable storage drive may, e.g., but is not limited to, read from and/or write to a removable storage unit in a well-known manner. The removable storage unit, also called a program storage device or a computer program product, may represent, e.g., but is not limited to, a floppy disk, magnetic tape, optical disk, compact disk, and so forth, which may be read from and written to the removable storage drive. As will be appreciated, the removable storage unit may include a computer usable storage medium having stored therein computer software and/or data.

In some embodiments, the secondary memory may include other similar devices for allowing computer programs or other instructions to be loaded into the computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to the computer system.

Some embodiments include electronic components, such as microprocessors, storage and memory that store computer program instructions in a machine-readable or computer-readable medium (alternatively referred to as computer-readable storage media, machine-readable media, or machine-readable storage media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The computer may also include an input device may include any mechanism or combination of mechanisms that may permit information to be input into the computer system from, e.g., a user. The input device may include logic configured to receive information for the computer system from, e.g., a user. Examples of the input device may include, e.g., but not limited to, a mouse, pen-based pointing device, or other pointing device such as a digitizer, a touch sensitive display device, and/or a keyboard or other data entry device (none of which are labeled). Other input devices may include, e.g., but not limited to, a biometric input device, a video source, an audio source, a microphone, a web cam, a video camera, and/or another camera. The input device may communicate with a processor either wired or wirelessly.

The computer may also include output devices which may include any mechanism or combination of mechanisms that may output information from a computer system. An output device may include logic configured to output information from the computer system. Embodiments of output device may include, e.g., but not limited to, display, and display interface, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and so forth. The computer may include input/output (I/O) devices such as, e.g., (but not limited to) communications interface, cable and communications path, and so forth. These devices may include, e.g., but are not limited to, a network interface card, and/or modems. The output device may communicate with processor either wired or wirelessly. A communications interface may allow software and data to be transferred between the computer system and external devices.

The term "data processor" is intended to have a broad meaning that includes one or more processors, such as, e.g., but not limited to, that are connected to a communication infrastructure (e.g., but not limited to, a communications bus, cross-over bar, interconnect, or network, and so forth). The term data processor may include any type of processor, microprocessor and/or processing logic that may interpret and execute instructions, including application-specific integrated circuits (ASICs) and field-programmable gate arrays (FPGAs). The data processor may comprise a single device (e.g., for example, a single core) and/or a group of devices (e.g., multi-core). The data processor may include logic configured to execute computer-executable instructions configured to implement one or more embodiments. The instructions may reside in main memory or secondary memory. The data processor may also include multiple independent cores, such as a dual-core processor or a multi-core processor. The data processors may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement embodiments falling within the scope of the claims using other computer systems and/or architectures.

The term "data storage device" is intended to have a broad meaning that includes removable storage drive, a hard disk installed in hard disk drive, flash memories, removable discs, non-removable discs, and so forth. In addition, it should be noted that various electromagnetic radiation, such as wireless communication, electrical communication carried over an electrically conductive wire (e.g., but not limited to twisted pair, CAT5, and so forth) or an optical medium (e.g., but not limited to, optical fiber) and the like may be encoded to carry computer-executable instructions and/or computer data that embodiments described herein on e.g., a communication network. These computer program products may provide software to the computer system. It should be noted that a computer-readable medium that comprises computer-executable instructions for execution in a processor may be configured to store embodiments falling within the scope of the claims.

The term "network" is intended to include any communication network, including a local area network ("LAN"), a wide area network ("WAN"), an Intranet, or a network of networks, such as the Internet.

The term "software" is meant to include firmware residing in read-only memory or applications stored in magnetic storage, which can be read into memory for processing by a processor. Also, some embodiments may be implemented as multiple software components as sub-parts of a larger program while remaining their distinct software identities. Some embodiments may also be implemented as separate software programs. Finally, any combination of separate programs that together implement software for performing processes described here is within the scope of the claims. In some embodiments, the software programs, when installed to operate on one or more electronic systems, define one or more specific machine implementations that execute and perform the operations of the software programs.

A method for event planning, comprising:

receiving awarded request for proposal (RFP) data from a plurality of venues, the awarded RFP data comprising historical event data that is associated with a plurality of previously held events, the historical event data comprising dates the previously held events took place, venues where the previously held events were held, and names of the previously held events;

receiving a comp set from a particular venue in the plurality of venues, the comp set comprising one or more venues in the plurality of venues; and displaying, to the particular venue, at least a portion of the awarded RFP data, the portion of the awarded RFP data being associated with venues that are in the plurality of venues and that also are in the comp set.

2. The method, further comprising receiving an authorization to share awarded RFP data from each venue in the plurality of venues.

3. The method, wherein the portion further comprises awarded RFP data associated with venues that are in the plurality of venues and that are not in the comp set.

4. The method, further comprising:

receiving, from a particular event planner, new RFP data for a future event, the new RFP data associated with at least one venue that is in the comp set;

receiving, from the particular event planner, an authorization to share the new RFP data; and displaying, to the particular venue, the new RFP data from the particular event planner.

5. The method, further comprising:

receiving, from the particular event planner, an authorization to share contact information for the particular event planner; and displaying, to the particular venue, contact information for the particular event planner.

6. The method, wherein the particular venue is a first venue, the comp set is a first comp set, and the portion of the awarded RFP data is a first portion, the method further comprising:

receiving a second comp set from a second venue in the plurality of venues, the second comp set comprising one or more venues in the plurality of venues; and displaying, to the second venue, at least a second portion of the awarded RFP data, the second portion of the awarded RFP data being associated with venues that are in the plurality of venues and that also are in the second comp set.

7. The method, wherein the historical event data further comprises financial data for at least one event in the plurality of previously held events.

8. The method, further comprising receiving an authorization to share historical event data from each venue in the plurality of venues.

9. The method, wherein the awarded RFP data further comprises future event data that is associated with a plurality of future events, the future event data comprising dates the future events are scheduled to take place, venues where the future events are scheduled to be held, and names of the future events.

10. The method, further comprising receiving an authorization to share future event data from each venue in the plurality of venues.

11. The method, wherein the future event data further comprises financial data for at least one event in the plurality of future events.

12. The method, further comprising displaying at least the portion of the awarded RFP data to the particular venue in one of a list view and a calendar view.

13. The method, further comprising:

receiving public RFP data, said public RFP data comprising at least one of internal RFP data that has been marked public and external RFP data that has been retrieved from a public source; and displaying public RFP data to the particular venue in one of the list view and the calendar view.

14. The method, further comprising:

using the awarded RFP data to train a model for event planning, resulting in a trained model;

using the trained model, generating predicted event data corresponding to a plurality of predicted events, the predicted event data comprising one or more of dates the predicted events are predicted to take place, venues where the predicted events are predicted to be held, names of the predicted events, and financial data for at least one predicted event in the plurality of predicted events; and displaying the predicted event data to the particular venue in one of the list view and the calendar view.

A non-transitory computer-readable medium storing a set of instructions for event planning, which when executed by a computer, configure the computer to:

receive awarded request for proposal (RFP) data from a plurality of venues, the awarded RFP data comprising historical event data that is associated with a plurality of previously held events, the historical event data comprising dates the previously held events took place, venues where the previously held events were held, and names of the previously held events;

receive a comp set from a particular venue in the plurality of venues, the comp set comprising one or more venues in the plurality of venues; and display, to the particular venue, at least a portion of the awarded RFP data, the portion of the awarded RFP data being associated with venues that are in the plurality of venues and that also are in the comp set.

30. The non-transitory computer-readable medium, wherein the instructions, when executed by the computer, further configure the computer to receive an authorization to share awarded RFP data from each venue in the plurality of venues.

31. The non-transitory computer-readable medium, wherein the portion further comprises awarded RFP data associated with venues that are in the plurality of venues and that are not in the comp set.

32. The non-transitory computer-readable medium, wherein the instructions, when executed by the computer, further configure the computer to:

receive, from a particular event planner, new RFP data for a future event, the new RFP data associated with at least one venue that is in the comp set;

receive, from the particular event planner, an authorization to share the new RFP data; and display, to the particular venue, the new RFP data from the particular event planner.

33. The non-transitory computer-readable medium, wherein the instructions, when executed by the computer, further configure the computer to:

receive, from the particular event planner, an authorization to share contact information for the particular event planner; and display, to the particular venue, contact information for the particular event planner.

34. The non-transitory computer-readable medium, wherein the particular venue is a first venue, the comp set is a first comp set, and the portion of the awarded RFP data is a first portion, and wherein the instructions, when executed by the computer, further configure the computer to:

receive a second comp set from a second venue in the plurality of venues, the second comp set comprising one or more venues in the plurality of venues; and display, to the second venue, at least a second portion of the awarded RFP data, the second portion of the awarded RFP data being associated with venues that are in the plurality of venues and that also are in the second comp set.

35. The non-transitory computer-readable medium, wherein the historical event data further comprises financial data for at least one event in the plurality of previously held events.

36. The non-transitory computer-readable medium, wherein the instructions, when executed by the computer, further configure the computer to receive an authorization to share historical event data from each venue in the plurality of venues.

37. The non-transitory computer-readable medium, wherein the awarded RFP data further comprises future event data that is associated with a plurality of future events, the future event data comprising dates the future events are scheduled to take place, venues where the future events are scheduled to be held, and names of the future events.

38. The non-transitory computer-readable medium, wherein the instructions, when executed by the computer, further configure the computer to receive an authorization to share future event data from each venue in the plurality of venues.

39. The non-transitory computer-readable medium, wherein the future event data further comprises financial data for at least one event in the plurality of future events.

40. The non-transitory computer-readable medium, wherein the instructions, when executed by the computer, further configure the computer to display at least the portion of the awarded RFP data to the particular venue in one of a list view and a calendar view.

41. The non-transitory computer-readable medium, wherein the instructions, when executed by the computer, further configure the computer to:

receive public RFP data, said public RFP data comprising at least one of internal RFP data that has been marked public and external RFP data that has been retrieved from a public source; and display public RFP data to the particular venue in one of the list view and the calendar view.

42. The non-transitory computer-readable medium, wherein the instructions, when executed by the computer, further configure the computer to:

use the awarded RFP data to train a model for event planning, resulting in a trained model;

using the trained model, generate predicted event data corresponding to a plurality of predicted events, the predicted event data comprising one or more of dates the predicted events are predicted to take place, venues where the predicted events are predicted to be held, names of the predicted events, and financial data for at least one predicted event in the plurality of predicted events; and display the predicted event data to the particular venue in one of the list view and the calendar view.

43. A method of displaying event planning information on a user interface, comprising:

selecting, from awarded request for proposal (RFP) data from a plurality of venues, a portion of awarded RFP data associated with venues that are in the plurality of venues and that also are in a comp set for a particular venue;

displaying, on the user interface, the portion of awarded RFP data in a calendar grid of cells comprising a plurality of rows and a plurality of columns, with each row of said calendar grid corresponding to a different venue in the comp list, each column of said calendar grid corresponding to a different day; and further displaying, in each cell, information associated with any events occurring at a respective venue corresponding to a row of the cell and occurring on a respective date corresponding to a column of the cell, wherein the comp set comprises one or more venues in the plurality of venues.

44. The method, further comprising:

receiving a user input to request display of awarded RFP data corresponding to a range of dates; and in response to receiving the user input, displaying on the user interface in the calendar grid of cells, awarded RFP data corresponding to the range of dates, with each column of the calendar grid of cells corresponding to different dates within the range of dates.

45. The method, further comprising:

receiving a user input to scroll the grid of cells horizontally, so as to bring into view a first column at one vertical edge of the calendar grid of cells, and to hide a second column at the other, opposite vertical edge of the calendar grid of cells; and in response to receiving the user input, displaying in the calendar grid of cells, awarded RFP data corresponding to a date associated with the first column, and removing from display in the calendar grid of cells, awarded RFP data corresponding to a date associated with the second column.

46. The method, further comprising:

receiving a user input to scroll the calendar grid of cells vertically, so as to bring into view a first row at one horizontal edge of the calendar grid of cells, and to hide a second row at the other, opposite horizontal edge of the calendar grid of cells; and in response to receiving the user input, displaying in the calendar grid of cells, awarded RFP data corresponding to a venue associated with first row, and removing from display in the calendar grid of cells, awarded RFP data corresponding to a venue associated with the second row.

47. The method, wherein the portion of awarded RFP data is a first portion of the awarded RFP data, and the displayed information associated with a particular event comprises a label, the label indicating that the particular event is of one of a plurality of event types, the method further comprising:

receiving a user input to select the label;

in response to receiving the user input, selecting, from the portion of awarded RFP data, a second portion of the awarded RFP data corresponding to RFP data of an event type corresponding to the selected label; and displaying, on the user interface, the second portion of the awarded RFP data in the calendar grid of cells, wherein the plurality of event types comprises a public event type and a predicted event type.

48. The method, wherein the awarded RFP data comprises historical event data that is associated with a plurality of previously held events, and the historical event data comprises dates the previously held events took place, venues where the previously held events were held, and names of the previously held events.

49. A method of displaying event planning information on a user interface, comprising:

selecting, from awarded request for proposal (RFP) data from a plurality of venues, a portion of awarded RFP data associated with venues that are in the plurality of venues and that also are in a comp set for a particular venue;

displaying, on the user interface, the portion of awarded RFP data in a sortable list comprising a plurality of rows and a plurality of columns, with each row of said sortable list corresponding to a different event in the portion of the awarded RFP data, and each column of said sortable list corresponding to a plurality of fields storing information associated with each event;

receiving a user input to request display of awarded RFP data sorted according to a particular field in the plurality of fields; and in response to receiving the user input, displaying on the user interface in the sortable list of cells, rows of awarded RFP data sorted by the particular field, wherein the information associated with each event comprises an event cost, an event description, and an awarded venue location.

wherein the comp set comprises one or more venues in the plurality of venues.

50. The method, further comprising:

receiving a user input to scroll the sortable list of cells horizontally, so as to bring into view a first column at one vertical edge of the sortable list of cells, and to hide a second column at the other, opposite vertical edge of the sortable list of cells; and in response to receiving the user input, displaying in the sortable list of cells, event information associated with the first column, and removing from display in the sortable list of cells, event information associated with the second column.

51. The method, further comprising:

receiving a user input to scroll the sortable list of cells vertically, so as to bring into view a first row at one horizontal edge of the sortable list of cells, and to hide a second row at the other, opposite horizontal edge of the sortable list of cells; and in response to receiving the user input, displaying in the sortable list of cells, awarded RFP data corresponding to an event associated with first row, and removing from display in the sortable list of cells, awarded RFP data corresponding to an event associated with the second row.

52. The method, wherein the portion of awarded RFP data is a first portion of the awarded RFP data, and the displayed information associated with a particular event comprises a label, the label indicating that the particular event is of one of a plurality of event types, the method further comprising:

receiving a user input to select the label;

in response to receiving the user input, selecting, from the portion of awarded RFP data, a second portion of the awarded RFP data corresponding to RFP data of an event type corresponding to the selected label; and displaying, on the user interface, the second portion of the awarded RFP data in the sortable list of cells, wherein the plurality of event types comprises a public event type and a predicted event type.

53. The method, wherein the awarded RFP data comprises historical event data that is associated with a plurality of previously held events, and the historical event data comprises dates the previously held events took place, venues where the previously held events were held, and names of the previously held events.

The embodiments illustrated and discussed in this specification are intended only to teach those skilled in the art how to make and use the invention. In describing embodiments described herein, specific terminology is employed for the sake of clarity. However, the claims are not to be limited to the specific terminology so selected. The above-described embodiments described herein may be modified or varied, without departing from the scope of the claims, as appreciated by those skilled in the art in light of the above teachings. It is therefore to be understood that, within the scope of the claims and their equivalents, particular embodiments may be practiced otherwise than as specifically described. For example, it is to be understood that the present disclosure contemplates that, to the extent possible, one or more features of any embodiment can be combined with one or more features of any other embodiment.

We claim:

1. A method of displaying event planning information on a user interface, comprising:

selecting, from awarded request for proposal (RFP) data from a plurality of venues, a portion of awarded RFP data associated with venues that are in the plurality of venues and that also are in a comp set for a particular venue;

displaying, on the user interface, the portion of awarded RFP data in a sortable list comprising a plurality of rows and a plurality of columns, with each row of said sortable list corresponding to a different event in the portion of the awarded RFP data, and each column of said sortable list corresponding to a plurality of fields storing information associated with each event;

receiving a user input to request display of awarded RFP data sorted according to a particular field in the plurality of fields; and in response to receiving the user input, displaying on the user interface in the sortable list of cells, rows of awarded RFP data sorted by the particular field, wherein the information associated with each event comprises an event cost, an event description, and an awarded venue location, wherein the comp set comprises one or more venues in the plurality of venues.

2. The method of claim 1, further comprising:

receiving a user input to scroll the sortable list of cells horizontally, so as to bring into view a first column at one vertical edge of the sortable list of cells, and to hide a second column at the other, opposite vertical edge of the sortable list of cells; and in response to receiving the user input, displaying in the sortable list of cells, event information associated with the first column, and removing from display in the sortable list of cells, event information associated with the second column.

3. The method of claim 1, further comprising:

receiving a user input to scroll the sortable list of cells vertically, so as to bring into view a first row at one horizontal edge of the sortable list of cells, and to hide a second row at the other, opposite horizontal edge of the sortable list of cells; and in response to receiving the user input, displaying in the sortable list of cells, awarded RFP data corresponding to an event associated with first row, and removing from display in the sortable list of cells, awarded RFP data corresponding to an event associated with the second row.

4. The method of claim 1, wherein the portion of awarded RFP data is a first portion of the awarded RFP data, and the displayed information associated with a particular event comprises a label, the label indicating that the particular event is of one of a plurality of event types, the method further comprising:

receiving a user input to select the label;

in response to receiving the user input, selecting, from the portion of awarded RFP data, a second portion of the awarded RFP data corresponding to RFP data of an event type corresponding to the selected label; and displaying, on the user interface, the second portion of the awarded RFP data in the sortable list of cells, wherein the plurality of event types comprises a public event type and a predicted event type.

5. The method of claim 1, wherein the awarded RFP data comprises historical event data that is associated with a plurality of previously held events, and the historical event data comprises dates the previously held events took place, venues where the previously held events were held, and names of the previously held events.

* * * * *